United States Patent Office 2,804,462
Patented Aug. 27, 1957

2,804,462

(5-BENZYLOXY-3-INDOLE)-ALKYLAMINES AND PREPARATION THEREOF

Merrill E. Speeter, Kalamazoo, Mich., assignor to The Upjohn Company, Kalamazoo, Mich., a corporation of Michigan No Drawing. Application April 14, 1952, Serial No. 282,273

9 Claims. (Cl. 260—319)

The present invention relates to novel organic compounds, and is more particularly concerned with a novel process for the preparation of (5-benzyloxy-3-indole)-alkylamines, and with the products thus-produced. This application is a continuation-in-part of my prior filed copending applications, Serial Number 279,931, filed April 1, 1952 and Serial Number 260,315, filed December 6, 1951, which issued on March 1, 1955, as U. S. Patent 2,703,325.

The compounds of the present invention may be represented by the formula:

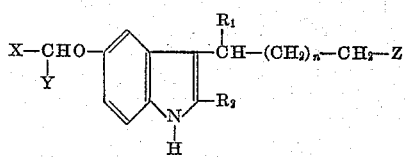

wherein X represents phenyl, halophenyl, lower alkoxyphenyl, or lower alkylphenyl, Y represents hydrogen, phenyl, halophenyl, lower alkoxyphenyl, or lower alkylphenyl, $R_1$ and $R_2$ represent hydrogen or lower alkyl, and wherein $n$ is selected from zero and one. Z and $R_4$ represent the amino radical

wherein $R_3$ represents hydrogen, and saturated hydrocarbon radicals such as alkyl, cycloalkyl, phenyl, and aralkyl. The secondary and tertiary amino radicals thus represented by Z include such radicals as alkylamino, aralkylamino, cycloalkylamino, phenylamino, dicycloalkylamino, diaralkylamino, dialkylamino, diphenylamino, alkyl aralkylamino, alkyl cycloalkylamino, alkyl phenylamino, aralkyl cycloalkylamino, aralkyl phenylamino, or cycloalkyl phenylamino, and Z can also represent a saturated monoheterocyclic amino radical selected from five and six atom saturated monoheterocyclic amino radicals, including amino radicals such as piperidyl, morpholyl, pyrrolidyl, thiomorpholyl, or the like.

It is an object of the present invention to prepare novel compounds (5 - benzyloxy - 3 - indole) - alkylamines, and salts thereof. It is a further object of the present invention to provide a novel process for the preparation of the (5-benzyloxy-3-indole)-alkylamines, acid addition salts, and quaternary ammonium salts thereof. Other objects of the invention will be apparent to one skilled in the art to which the invention pertains. The novel compounds of the present invention are important intermediates in the preparation of (5-hydroxy-3-indole)-alkylamines; more specifically the (5-hydroxy-3-indole)-alkylamines include 5-hydroxytryptamine, more briefly named serotonin, a substance known to possess powerful vasoconstrictor qualities, and analogs thereof, such as the 5-hydroxy - 3-[2 - (N-methylamino)-ethyl]-indole, 5-hydroxy-3-[2-(N-isopropylamino)-ethyl]-indole, and the like, which analogs have also demonstrated marked vasoconstrictor qualities.

In the preparation of (5-hydroxy-3-indole)-alkylamines, the compounds of the present invention, the (5-benzyloxy-3-indole)-alkylamines, are subjected to hydrogenolysis in the presence of a catalyst which results in debenzylation of the (5-benzyloxy-3-indole)-alkylamines to yield the desirable (5-hydroxy-3-indole)-alkylamines.

According to the method of the present invention the (5-benzyloxy-3-indole)-alkylamines are prepared by the reaction of a reducing agent with a (5-benzyloxy-3-indole)-alkanoylamide represented by the formula:

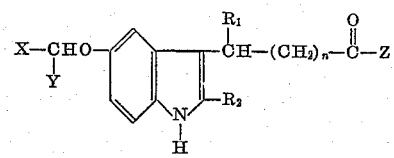

wherein X, Y, Z, $R_1$, and $R_2$ and $n$ have the values specified above. In this formula, Z may also be —NH$_2$.

The starting compounds for the method of the present invention, the (5-benzyloxy-3-indole)-alkanoylamides, are prepared by the reaction of a Grignard reagent with a 5-benzyloxyindole represented by the formula:

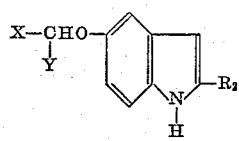

wherein X, Y, and $R_2$ have the values specified above, to convert the 5-benzyloxyindole into a Grignard reagent, and thereafter reacting the 5-benzyloxyindole Grignard reagent with a haloalkanoylamide, such as the α-haloacetamides, β-halopropionamides, and the like, which may be represented by the following general formula:

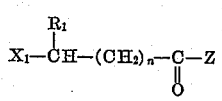

wherein $X_1$ represents a halogen, i. e., chlorine, iodine or bromine, and $R_1$, Z and $n$ have the same values as given above, to produce the desired (5-benzyloxy-3-indole)-alkanoylamide. The starting 5-benzyloxyindoles may be prepared according to the method of Burton and Stoves [J. Chem. Soc. 1937, 1726]. Alternatively the 5-benzyloxyindoles may be prepared by the reductive cyclization of the 5-benzyloxy-β,2-dinitrostyrenes, as more fully disclosed in my copending application, Serial Number 273,149, filed February 23, 1952. The 5-benzyloxy-β,2-dinitrostyrenes are prepared by the dehydration of the 5-benzyloxy-2-nitro-α-[1-(1-nitroalkyl)]benzyl alcohols, as more fully disclosed in my copending application, Serial Number 273,148, filed February 23, 1952. The 5-benzyloxy-2-nitro-α-[1-(1-nitroalkyl)]benzyl alcohols are prepared by the condensation of 5-benzyloxy-2-nitrobenzaldehydes with a 1-nitroalkane, as more fully disclosed in U. S. Patent 2,698,345. The 5-benzyloxy-2-nitrobenzaldehydes are prepared according to the method of Burton [J. Chem. Soc. 1935, 1265] or Portmann and Giovannini [Helv. Chim. Acta 31, 1381 (1948)].

In the preparation of the (5-benzyloxy-3-indole)-alkanoylamides, the Grignard reaction is usually carried out in the presence of an organic solvent, diethyl ether or dibutyl ether being preferred, although other organic solvents, suitable for use in Grignard reactions, such as benzene, toluene, or anisole, can also be used. In some instances dimethylformamide may also be utilized. A great many Grignard reagents are satisfactory, among them being those prepared from alkyl halides, cycloalkyl halides, aryl halides, and aralkyl halides, the lower alkyl halides, such as methyl iodide and ethyl iodide, being preferred. The preparation of the 5-benzyloxyindole Grignard reagent is usually conducted at the boiling point of the solvent employed, although other temperatures between about zero and 150 degrees centigrade may also be used, a longer reaction period being required in the lower temperature ranges. The resulting 5-benzyloxyindolemagnesium halide is then reacted with a haloalkanoylamide such as the α-haloacetamides, β-halopropionamides, or the like, in the presence of the same organic solvent utilized in the preparation of the Grignard reactant although other solvents may also be used if desired. The reaction of the haloalkanoylamide and the 5-benzyloxyindolemagnesium halide is usually conducted at the boiling point of the solvent employed, although other temperatures between about zero and 150 degrees centigrade, preferably about 100 degrees centigrade, may also be used. Upon removal of the organic solvent by distillation, the remaining residue is heated on a steambath, and a heavy oil obtained on cooling. The (5-benzyloxy-3-indole)-alkanoylamides may then be isolated from the oil as a crystalline compound by known procedure, or in some instances the (5-benzyloxy-3-indole)-alkanoylamides need not be isolated as crystalline product, in which case the oil may be treated directly with a reducing agent to produce the desired (5-benzyloxy-3-indole)-alkylamine. One method for the separation of the (5-benzyloxy-3-indole)-alkanoylamides from the oil involves the addition of an organic solvent, such as ether, chloroform, or benzene, with ether being preferred, to the oil, and hydrolysis of the mixture, as with dilute acetic acid, whereupon the (5-benzyloxy-3-indole)-alkanoylamides separate from the mixture. Upon filtration the product may be recrystallized from alcohol to a greater degree of purity. The primary amide, wherein Z is —NH$_2$, may be prepared in the same manner.

In the method of the present invention, numerous reducing agents are suitable for the reduction of the (5-benzyloxy-3-indole)-alkanoylamides. Representative reducing agents include metal hydrides, such as lithium aluminum hydride, lithium aluminum borohydride, and the like, with lithium aluminum hydride being preferred. The reduction of the (5-benzyloxy-3-indole)-alkanoylamides can also be accomplished catalytically, in which case platinum is the preferred catalyst. The non-catalytic reduction is usually conducted in an organic solvent, with tetrahydrofuran being preferred, although other well known solvents such as isopropyl ether, ether, N-methylmorpholine, dioxane, and the like, may also be used. The reduction of the (5-benzyloxy-3-indole)-alkanoylamides is usually accomplished at the boiling point of the solvent used, although other temperatures between about zero and 100 degrees may be employed, and preferably zero to 65 degrees centigrade when lithium aluminum hydride is the reducing agent utilized. After a suitable reaction period, usually from thirty minutes to five hours, the (5-benzyloxy-3-indole)-alkylamine free bases are readily obtained as heavy non-crystalline oils, or in some instances as a crystalline compound, by hydrolyzing the reaction product with aqueous ether followed by dilute alkali, extracting the alkaline residue with several portions of ether, combining the ether extracts, and concentrating and evaporating the solvent. Other conventional procedure for the hydrolysis may be used if desired, and other organic solvents may be used in place of ether. A preferable procedure, however, resides in reacting the free base, without isolation, with a stoichiometric quantity of an acid, such as hydrochloric, hydrobromic, sulfuric, acetic, tartaric, citric, or the like, to form the (5-benzyloxy-3-indole)-alkylamine acid addition salt. Similarly a quaternary ammonium salt may also be prepared by reacting the tertiary amine free base with an alkyl halide or aralkyl halide and such include the methochloride, ethobromide, benzyl chloride, and the like. In this manner, the free base may be separated as its crystalline salt, e. g., hydrochloride, which usually precipitates from the solution. Alternatively the free base may be isolated by removal of the solvent and admixed with a stoichiometric quantity of an acid, e. g., hydrochloric, to form the corresponding acid addition salt, or the isolated tertiary amine free base may be mixed with an alkyl halide or aralkyl halide to form the quaternary ammonium salt of the (5-benzyloxy-3-indole)-alkylamine employed. The (5-benzyloxy-3-indole)-alkylamine salts, so obtained, may be removed by filtration and so utilized, or the resulting salt precipitate may be further purified, if desired, by recrystallizing from alcohol-water solutions such as methanol-water, ethanol-water, isopropanol-water, and the like, with ethanol-water being preferred.

The following examples will serve to illustrate the process and products of this invention, but the said invention is not to be considered as limited thereto.

PREPARATION 1.—α-3-(5-BENZYLOXYINDOLE)-N-BENZYL-N-METHYLACETAMIDE

To a Grignard reagent prepared from 4.25 grams (0.03 mole) of methyl iodide and 2.4 grams of magnesium in 200 milliliters of ether was added a solution of 5.5 grams (0.025 mole) of 5-benzyloxyindole in 200 milliliters of ether. After heating under reflux for thirty minutes, the mixture was cooled in an ice-bath and to it was added a solution of 5.9 grams (0.03 mole) of α-chloro-N-benzyl-N-methylacetamide in 500 milliliters of ether. The mixture was stirred and the ether was removed by distillation, whereafter the reddish gummy residue was warmed for three hours on a steambath. The mixture was cooled and approximately 500 milliliters of ether was added, followed by the addition, with vigorous stirring, of a solution of five milliliters of glacial acetic acid and 95 milliliters of water. A light colored solid separated from solution. After standing overnight the product was collected and recrystallized from isopropanol. The α-3-(5-benzyloxyindole)-N-benzyl-N-methylacetamide melted at 151–152 degrees centigrade; yield, 7.5 grams (78 percent).

*Analysis.*—Percent calculated for $C_{25}H_{24}O_2N_2$: C, 78.13; H, 6.29. Found: C, 78.26; H, 6.21.

Other representative 5-benzyloxyindoles which may be utilized in the procedure to prepare the 5-benzyloxyindolemagnesium halides include the 5-benzyloxy-2-alkylindoles, e. g., 5-benzyloxy-2-methylindole, 5-benzyloxy-2-ethylindole, and the like; 5-benzhydryloxyindole; 5-alkylbenzyloxyindoles, e. g., 5-(para-methyl-benzyloxy)-indole, 5-(para,para' - dimethylbenzhydryloxy) - indole, 5 - (para,-para'-diethylbenzhydryloxy)-2-ethylindole, and the like; 5-halobenzyloxyindoles, e. g., 5-(para-chlorobenzyloxy)-indole, 5-para,para'-dichlorobenzhydroyloxy)-indole, 5-(para,para'-dibromobenzhydryloxy)-2-methylindole, and the like; 5- alkoxy-benzyloxyindoles, e. g., 5-(para-methoxybenzyloxy) - indole, 5 - (para,para' - dimethoxybenzhydryloxy)-indole, 5-(para,para'-diethoxybenzhydryloxy)-2-propylindole, and the like.

The preparation of the haloalkanoylamides utilized in the process of the present invention involves the addition of an acid halide to ether, cooling in an ice-bath, and adding thereto an amine with vigorous stirring, whereupon a heavy precipitate forms and may be removed by filtration. The precipitate is usually washed with several portions of ether and the combined filtrate then distilled under vacuum to remove the solvent and produce the desirable haloalkanoylamide. Representative haloalkanoylamides which can thus be prepared to react with the chosen 5-benzyloxyindolemagnesium halide to produce the desired (5-benzyloxy-3-indole)-alkanoylamide include the following α-haloacetamides: α-halo-N-alkyl-N-aralkylacetamides, e. g., α-chloro-N-methyl-N-benzylacetamide, α-chloro-N-benzyl-N-isopropylacetamide; α-halo-N,N-dialkylacetamides, e. g., α-chloro-N,N-dimethylacetamide, α-chloro-N,N-dibutylacetamide, α-iodo-N,N-diethylacetamide; α-halo-N,N-diaralkylacetamides, e. g., α-chloro-N,N-dibenzylacetamide; α-halo-N,N-dicycloalkylacetamides, e. g., α-chloro-N,N-dicyclohexylacetamide; α-halo-α-alkyl-N-alkyl-N-aralkylacetamide, e. g., α-chloro-α-methyl-N-methyl-N-benzylacetamide; α-halo-N-aralkyl-N-cycloalkylacetamides, e. g., α-chloro-N-benzyl-N-cyclohexylacetamide, α-bromo-N-phenethyl-N-cyclopentylacetamide; α-haloacetylpiperidides, e. g., α-chloroacetylpiperidide; β-halopropionamides such as β-halo-N,N-dialkylpropionamides, e. g., β-chloro-N,N-diethylpropionamide; β-halo-N-alkyl-N-aralkylpropionamides, e. g., β-iodo-N-methyl-N-benzylpropionamide; β-halo-β-alkyl-N-aralkylpropionamides, e. g., β-chloro-β-ethyl-N-benzylpropionamide, and the like. Other methods for the preparation of the starting haloalkanoylamides are disclosed by Buehler et al., [J. Am. Chem. Soc. 59, 421 (1937)], Jacobs et al., [J. Biol. Chem. 21, 148 (1915)], or Frericks [Arch. Pharm. 241, 218 (1903)].

*Example 1.—5-benzyloxy-3-[2-(N-benzyl-N-methylamino)-ethyl]-indole and salts thereof*

A solution of 3.84 grams (0.01 mole) of α-3-(5-benzyloxyindole)-N-benzyl-N-methylacetamide, obtained in Preparation 1, in 150 milliliters of tetrahydrofuran was added with stirring to a solution of 3.7 grams (0.10 mole) of lithium aluminum hydride in 200 milliliters of tetrahydrofuran. The mixture was heated under reflux for thirty minutes, concentrated to a volume of about 75 milliliters, and diluted with 500 milliliters of ether followed by fifty milliliters of five percent sodium hydroxide solution. The ether layer was decanted and the aqueous alkaline residue extracted with several 300-milliliter portions of ether. To the combined ether solutions of the free 5-benzyloxy-3-[2-(N-benzyl-N-methylamino)-ethyl]-indole was added water, followed by fifty milliliters of fifteen percent hydrochloric acid. A white solid separated which was filtered, washed with ether, and recrystallized from ethanol. The yield of 5-benzyloxy-3-[2-(N-benzyl-N-methylamino)-ethyl]-indole hydrochloride, melting at 110–112 degrees centigrade, was 2.9 grams (71 percent).

*Analysis.*—Percent calculated for $C_{25}H_{26}ON_2 \cdot HCl$: C, 73.79; H, 6.69. Found: C, 73.74; H, 6.69.

In essentially the same manner as disclosed in Example 1, other salts such as the hydrobromide, sulfate, acetate, tartrate, citrate, or the like, are prepared by reacting the free 5-benzyloxy-3-[2-(N-benzyl-N-methylamino)-ethyl]-indole with the following acids: hydrobromic, sulfuric, acetic, tartaric, citric, or the like.

In the same manner, 5-benzyloxy-3-(2-aminoethyl)-indole (the primary amine) and salts thereof, are prepared from the corresponding primary amides. The 5-benzyloxy-3-(2-aminoethyl)-indole hydrochloride melted at 248–250 degrees centigrade with decomposition.

*Analysis.*—Percent calculated for $C_{17}H_{19}ClN_2O$: C, 67.42; H, 6.32; Cl, 11.71; N, 9.20. Found: C, 67.26; H, 6.34; Cl, 11.78; N, 9.20.

*Example 2.—5-benzyloxy-3-[2-(N,N-dibenzylamino)-ethyl]-indole*

In essentially the same manner as shown in Example 1, the free base 5-benzyloxy-3-[2-(N,N-dibenzylamino)-ethyl]-indole is prepared by reducing α-3-(5-benzyloxyindole)-N,N-dibenzylacetamide, with lithium aluminum hydride. The free base melted at 101–102 degrees centigrade.

*Analysis.*—Percent calculated for $C_{31}H_{30}ON_2$: C, 83.38; H, 6.86; N, 6.27. Found: C, 83.54; H, 6.87; N, 5.80.

*Example 3.—5-benzyloxy-3-[2-(N,N-dibenzylamino)-ethyl]-indole and salts thereof*

In essentially the same manner as shown in Example 1, 5-benzyloxy-3-[2-(N,N-dibenzylamino)-ethyl]-indole and its hydrochloride are prepared by reacting the free base, 5-benzyloxy-3-[2-(N,N-dibenzylamino)-ethyl]-indole, obtained in Example 2, with water and hydrochloric acid. The 5-benzyloxy-3-[2-(N,N-dibenzylamino)-ethyl]-indole hydrochloride was obtained in 65 percent yield and melted at 232–233 degrees centigrade.

*Analysis.*—Percent calculated for $C_{31}H_{30}ON_2 \cdot HCl$: C, 77.07; H, 6.45; N, 5.80. Found: C, 77.42; H, 6.68; N, 5.73.

*Example 4.—5-benzyloxy-3-[2-(N,N-dimethylamino)-ethyl]-indole and salts thereof*

In essentially the same manner as shown in Example 1, 5-benzyloxy-3-[2-(N,N-dimethylamino)-ethyl]-indole and its hydrochloride are prepared by reducing α-3-(5-benzyloxyindole)-N,N-dimethylacetamide with lithium aluminum hydride. The 5-benzyloxy-3-[2-(N,N-dimethylamino)-ethyl]-indole hydrochloride was obtained in 29 percent yield (based on 5-benzyloxyindole) and melted at 154–155 degrees centigrade.

*Analysis.*—Percent calculated for $C_{19}H_{22}ON_2 \cdot HCl$: C, 68.96; H, 7.00; N, 8.46; Cl, 10.71. Found: C, 68.97; H, 6.87; N, 8.21; Cl, 10.76.

*Example 5.—5-benzyloxy-3-[2-(1-piperidine)-ethyl]-indole and salts thereof*

In essentially the same manner as shown in Example 1, 5-benzyloxy-3-[2-(1-piperidine)-ethyl]-indole and its hydrochloride are prepared by reducing α-3-(5-benzyloxyindole)-acetopiperidide with lithium aluminum hydride. The 5-benzyloxy-3-[2-(1piperidine)-ethyl]-indole hydrochloride was obtained in 11.5 percent yield (based on 5-benzyloxyindole) and melted at 208–209.5 degrees centigrade.

*Analysis.*—Percent calculated for $C_{22}H_{26}ON_2 \cdot HCl$: C, 71.23; H, 7.35; N, 7.57; Cl, 9.57. Found: C, 71.27; H, 7.49; N, 7.19; Cl, 9.39.

In the same manner the following (5-benzyloxy-3-indole)-alkylamines are prepared by reducing the corresponding (5-benzyloxy-3-indole)-alkanoylamide: 2-ethyl-5-benzyloxy-3-[2-(1-piperidine)-ethyl]-indole, 5-benzyloxy-3-[1-methyl-2-(1-piperidine)-ethyl]-indole, 5-benzyloxy-3-[2-(4-morpholine)-ethyl]-indole, 5-benzyloxy-3[2-(1-pyrrolidine)-ethyl]-indole, 5-benzyloxy-3-[2-(4-thiomorpholine)-ethyl]-indole, 5-benzyloxy-3-[3-(1-piperidine)-propyl]-indole, 5-benzyloxy-3-[1-ethyl-3-(1-piperidine)-propyl]-indole, and the like.

*Example 6.—5-(para,para'-dimethylbenzhydryloxy)-3-[1-methyl-3-(N,N-dibenzylamino)-propyl]-indole and salts thereof*

In essentially the same manner as shown in Example 1, 5-(para,para'-dimethylbenzhydryloxy)-3-[1-methyl-3-(N,N-dibenzylamino)-propyl]-indole is prepared by reducing the β-3-[5-(para,para'-dimethylbenzhydryloxy)-indole]-β-methyl-N,N-dibenzylpropionamide with lithium borohydride, and the sulfate salt thereof is prepared by reacting the free 5-(para,para'-dimethylbenzhydryloxy)-3-[1-methyl-3-(N,N-dibenzylamino)-propyl]-indole with sulfuric acid.

In the same manner the following (5-alkylbenzyloxy-3-indole)-alkylamines are prepared by reducing the corresponding (5-alkylbenzyloxy-3-indole)-alkanoylamide: 5 - (para - methylbenzyloxy) - 3 - [2 - (N - benzylamino)-ethyl]-indole, 5-(para-propylbenzyloxy)-3-[2-(N-isopropyl-N-benzylamino)-ethyl]-indole, 2-methyl-5-(para-ethylbenzyloxy) - 3 - [2 - (N - phenylamino) - ethyl]-indole, 5 - (para,para' - dimethylbenzhydryloxy) - 3 - [2 - (N-isopropylamino)-ethyl]-indole, 5-(para-ethylbenzyloxy)-3-[3-(N-benzylamino)-propyl]-indole, and the like.

*Example 7.—2 - ethyl - 5 - (para,para' - dichlorobenzhydryloxy) - 3 - [2 - (N - methyl - N - benzylamino)-ethyl]-indole and salts thereof*

In essentially the same manner as shown in Example 1, 2-ethyl-5-(para,para'-dichlorobenzhydryloxy)-3-[2-(N-methyl-N-benzylamino)-ethyl]-indole is prepared by reducing α-3-[5-(para,para'-dichlorobenzhydryloxy)-2-ethylindole]-N-methyl-N-benzylacetamide, and the hydrobromide salt thereof is prepared by reacting the free 2 - ethyl - 5 - (para,para' - dichlorobenzhydryloxy) - 3 - [2-(N-methyl-N-benzylamino)-ethyl]-indole with hydrobromic acid.

In the same manner the following (5-halobenzyloxy-3-indole)-alkylamines are prepared by reducing the corresponding (5-halobenzyloxy-3-indole)-alkanoylamide: 5-(para - iodobenzyloxy) - 3 - [2 - (N,N - dicyclohexylamino)-ethyl]-indole, 5-(para,para'-dichlorobenzhydryloxy) - 3 - [1 - ethyl - 2 - (N - methyl - N - benzylamino)-ethyl]-indole, 5-(para,para'-dichlorobenzhydryloxy)-3-[3-(N - isopropylamino) - propyl - indole, 5 - (para - bromobenzyloxy) - 3 - [1 - ethyl - 3 - (N - methylamino)-propyl]-indole, and the like.

*Example 8.—5-(para,para'-dimethoxybenzhydryloxy)-3-[3-(N,N-dibenzylamino)propyl]-indole and salts thereof*

In essentially the same manner as shown in Example 1, 5-(para,para'-dimethoxybenzhydryloxy)-3-[3-(N,N-dibenzylamino)-propyl]-indole and its hydrochloride are prepared by reducing β-3-[5-(para,para'-dimethoxybenzhydryloxy) - indole] - N,N - dibenzylpropionamide with lithium aluminum hydride.

In the same manner the following (5-alkoxybenzyloxy-3-indole)-alkylamines are prepared by reducing the corresponding (5-alkoxybenzyloxy-3-indole)-alkanoylamide: 5 - (para - methoxybenzyloxy) - 3 - [2 - (N,N - dicyclohexylamino)-ethyl]-indole, 5-(para,para'-dimethoxybenzhydryloxy) - 3 - [1 - propyl - 2 - (N - ethyl - N - cyclohexylamino) - ethyl] - indole, 2 - propyl - 5 - (para-ethoxybenzyloxy) - 3 - [2 - (N - benzylamino) - ethyl]-indole, 5 - (para,para' - dimethoxybenzhydryloxy) - 3-[2-(N,N-dibenzylamino)-ethyl]-indole, 5-(para-ethoxybenzyloxy) - 3 - [1 - ethyl - 3 - (N - benzylamino) - propyl]-indole, and the like.

*Example 9.—5-benzyloxy-3-[3-(N,N-diethylamino)-propyl]-indole and salts thereof*

In essentially the same manner as shown in Example 1, 5-benzyloxy-3-[3-(N,N-diethylamino)-propyl]-indole and its hydrochloride are prepared by reducing β-3-[5-benzyloxyindole)-N,N-diethylpropionamide with lithium aluminum hydride.

In the same manner the following (5-benzyloxy-3-indole)-alkylamines are prepared by reducing the corresponding (5-benzyloxy-3-indole)-alkanoylamide: 5-benzyloxy-3-[3-N-isopropylamino)-propyl]-indole, 5-benzyloxy-3-[3-(N,N-dimethylamino)-propyl]-indole, 5-benzyloxy - 3 - [3 - (N - methyl - N - benzylamino) - propyl]-indole, 5-benzyloxy-3-[1-methyl-3-(N-benzylamino)-propyl]-indole, 2-ethyl-5-benzyloxy-3-[3-(N-benzylamino)-propyl]-indole, and the like.

*Example 10.—5-benzhydryloxy-3-[2-(N-benzylamino)-ethyl]-indole and acid addition salts thereof*

In essentially the same manner as shown in Example 1, 5-benzhydryloxy-3-[2-(N-benzylamino)-ethyl]-indole and its hydrochloride are prepared by reducing α-3-(5-benzhydryloxyindole)-N-benzylacetamide with lithium aluminum hydride.

In the same manner the following (5-benzhydryloxy-3-indole)-alkylamines are prepared by reducing the corresponding (5 - benzhydryloxy - 3 - indole) - alkanoylamide: 5 - benzhydryloxy - 3 - [2 - (N - cyclopentyl - N-ethylamino)-ethyl]-indole, 5-benzhydryloxy-3-[1-ethyl-2-(N,N-diphenylamino)-ethyl]-indole, 2-methyl-5-benzhydryloxy - 3 - [2 - (N - benzyl - N - methylamino) - ethyl]-indole, 5-benzhydryloxy-3-[3-(N-methyl-N-benzylamino)-propyl]-indole, 5-benzhydryloxy-3-[1-ethyl-3-(N-methylamino)-propyl]-indole, and the like.

*Example 11.—5-benzyloxy-3-[2-(N,N-dibutylamino)-ethyl]-indole and salts thereof*

In essentially the same manner as shown in Example 1, 5 - benzyloxy - 3 - [2 - (N,N - dibutylamino) - ethyl]-indole and its hydrochloride are prepared by reducing α - 3 - (5 - benzyloxyindole) - N,N - dibutylacetamide with lithium aluminum hydride. The 5-benzyloxy-3-[2-(N,N-dibutylamino)-ethyl]indole hydrochloride melted at 218–220 degrees centigrade.

*Analysis.*—Percent calculated for $C_{25}H_{34}ON_2 \cdot HCl$: C, 72.36; H, 8.50; N, 6.75; Cl, 8.54. Found: C, 72.52; H, 8.56; N, 6.54; Cl, 8.19.

In the same manner the following (5-benzyloxy-3-indole)-alkylamines are prepared by reducing the corresponding (5-benzyloxy-3-indole)-alkanoylamide: 5-benzyloxy - 3 - [1 - methyl - 2 - (N - benzylamino) - ethyl]-indole, 2 - methyl - 5 - benzyloxy - 3 - [2 - (N,N - dicyclohexylamino) - ethyl - indole, 5 - benzyloxy - 3 - [2 - (N-cyclohexylamino) - ethyl] - indole, 5 - benzyloxy - 3 - [2-(N - methylamino) - ethyl] - indole, 5 - benzyloxy - 3 - [3-(N-methyl-N-benzylamino)-propyl]-indole, 5-benzyloxy-3-[1-methyl-3-(N-benzylamino)-propyl]-indole, and the like.

*Example 12.—5-benzyloxy-3-[2-(N-benzyl-N-phenethylamino)-ethyl]-indole and salts thereof*

In essentially the same manner as shown in Example 1, 5 - benzyloxy - 3 - [2 - (N - benzyl - N - phenethylamino)-ethyl]-indole and the hydrochloride thereof are prepared by reducing α-3-(5-benzyloxyindole)-N-benzyl-N-phenethylacetamide with lithium aluminum hydride. The 5 - benzyloxy - 3 - [2 - (N - benzyl - N - phenethylamino)-ethyl]-indole hydrochloride melted at 214–215 degrees centigrade.

*Analysis.*—Percent calculated for $C_{32}H_{33}N_2OCl$: C, 77.32; H, 6.69; N, 5.63; Cl, 7.13. Found: C, 77.06; H, 6.97; N, 5.50; Cl, 7.32.

*Example 13.—2-methyl-5-benzyloxy-3-[2-(N,N-dibenzylamino)-ethyl]-indole and salts thereof*

In essentially the same manner as given in Example 1, 2 - methyl - 5 - benzyloxy - 3 - [2 - (N,N - dibenzylamino)-ethyl]-indole is prepared by reducing α-3-(5-benzyloxy - 2 - methylindole) - N,N - dibenzylacetamide with lithium aluminum hydride, and reacting hydrochloric acid therewith to prepare the 2-methyl-5-benzyloxy-3-[2-(N,N-dibenzylamino)-ethyl]-indole hydrochloride, melting at 242–243 degrees centigrade.

*Analysis.*—Percent calculated for $C_{32}H_{32}N_2OHCl$: C, 77.03; H, 6.69; N, 5.62. Found: C, 77.05; H, 6.71; N, 5.77.

It is to be understood that this invention is not to be limited to the exact details of operation or exact compounds shown and described, as obvious modifications and equivalents will be apparent to one skilled in the art and the invention is therefore to be limited only by the scope of the appended claims.

I claim:

1. A compound selected from the group consisting of (1) a (5-benzyloxy-3-indole)-alkylamine having the formula:

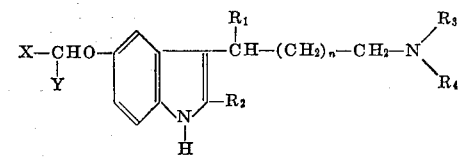

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, $R_1$ and $R_2$ are selected from the group consisting of hydrogen and alkyl, $n$ is selected from the group consisting of zero and one, and $R_3$ and $R_4$ are selected from the group consisting of hydrogen, alkyl, cycloalkyl, aralkyl, and phenyl, and additional members of the series wherein $R_3$ and $R_4$ together with the —N< form a saturated monoheterocyclic amino radical selected from the group consisting of five and six atom saturated mono-heterocyclic amino radicals, and (2) acid addition and quaternary ammonium salts thereof.

2. A (5-benzyloxy-3-indole)-ethylamine having the formula:

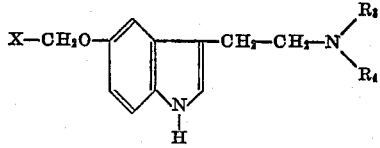

wherein X is phenyl, and $R_3$ and $R_4$ are saturated hydrocarbon radicals which together contain up to fourteen carbon atoms, inclusive.

3. A (5-benzyloxy-3-indole)-ethylamine having the formula:

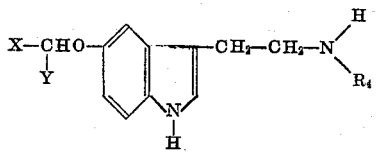

wherein X and Y are phenyl, and $R_4$ is a saturated hydrocarbon radical containing up to seven carbon atoms, inclusive.

4. A (5-benzyloxy-3-indole)-propylamine having the formula:

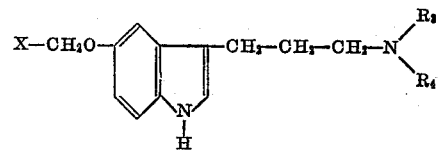

wherein X is phenyl, and $R_3$ and $R_4$ are saturated hydrocarbon radicals containing up to fourteen carbon atoms, inclusive.

5. 5 - benzyloxy - 3 - [2 - (N,N - dibenzylamino)-ethyl]-indole hydrochloride.
6. 5 - benzyloxy - 3 - [2 - (N - benzyl - N - methylamino)-ethyl]-indole hydrochloride.
7. 5 - benzyloxy - 3 - [2 - (N,N - dimethylamino)-ethyl]-indole hydrochloride.
8. 5 - benzyloxy - 3 - [3 - (N,N - diethylamino)-propyl]-indole hydrochloride.
9. 5-benzyloxy-3-(2-aminoethyl)-indole hydrochloride.

References Cited in the file of this patent
UNITED STATES PATENTS

| | | |
|---|---|---|
| 2,703,325 | Speeter | Mar. 1, 1955 |
| 2,708,197 | Speeter | May 10, 1955 |